United States Patent Office 3,661,915
Patented May 9, 1972

3,661,915
1-HYDROXYBENZO[b]QUINOLIZINE
DERIVATIVES
John T. Suh, Mequon, and Richard A. Schnettler, Brown Deer, Wis., assignors to Colgate-Palmolive Company, New York, N.Y.
No Drawing. Continuation-in-part of application Ser. No. 767,479, Oct. 14, 1968. This application Sept. 2, 1970, Ser. No. 69,140
Int. Cl. C07d 39/12
U.S. Cl. 260—289 R                  4 Claims

ABSTRACT OF THE DISCLOSURE

The compounds are 1-hydroxybenzo[b]quinolizines which are useful as agents to control aggressive anti-social behavior in animals. The compounds also may be used as intermediates in the preparation of pickling agents, moth-proofing agents and wood preservatives. Representative of compounds disclosed are cis-8,9-dimethoxy-1-hydroxy-1,3,4,6,11,11a-hexahydro - 2H - benzo[b]quinolizine and 8,9 - dimethoxy - 1 - hydroxy - 1 - (3 - chlorobenzyl)-1,3,4,6,11,11a-hexahydro-2H-benzo[b]quinolizine.

RELATED CASE

The present application is a continuation-in-part of our earlier copending application Ser. No. 767,479 filed Oct. 14, 1968, now abandoned.

DESCRIPTION OF THE INVENTION

The compounds of the present invention may be represented by the following formula:

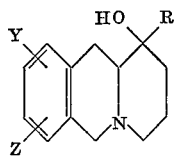

wherein Y and Z are the same or different members selected from hydrogen, hydroxy, a halogen such as bromo, chloro or fluoro, a lower alkoxy of 1 to 4 carbon atoms such as methoxy, ethoxy or propoxy, sulfamoyl, a lower alkyl sulfonamide such as methylsulfamoyl or trifluoromethyl and R is selected from hydrogen, an aryl group such as phenyl, a substituted phenyl, especially a halogen substituted phenyl such as p-chlorophenyl and o-chlorophenyl, a lower-alkoxy substituted phenyl such as p-methoxyphenyl and dimethoxyphenyl, a phenyl-lower alkyl containing 7 to 13 carbon atoms such as benzyl, phenethyl, phenylisopropyl or phenylbutyl and nuclear substituted phenyl-lower alkyls, especially halogen and alkoxy-substituted members such as p-chlorobenzyl and o-methoxyphenyl-lower alkyls, provided, however, that at least one of Y, Z and R is other than hydrogen.

The basic starting materials for the preparation of the novel compounds of the present invention are 3,4,11,11a-tetrahydro - 2H - benzo[b]-quinolizin - 1(6H) - ones of the following formula

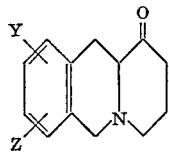

in which Y and Z are as previously defined. These compounds are known or can be prepared by known methods. (See S. Archer, J. Org. Chem., 16, 430 (1951).) Representative of these compounds are the following:

8,9-dimethoxy-3,4,11,11a-tetrahydro-2H-benzo[b] quinolizin-1(6H)-one,
8,9-dihydroxy-3,4,11,11a-tetrahydro-2H-benzo[b] quinolizin-1(6H)-one,
8-chloro-3,4,11,11a-tetrahydro-2H-benzo[b] quinolizin-1(6H)-one,
9-chloro-3,4,11,11a-tetrahydro-2H-benzo[b] quinolizin-1(6H)-one,
8-fluoro-3,4,11,11a-tetrahydro-2H-benzo[b] quinolizin-1(6H)-one,
9-fluoro-3,4,11,11a-tetrahydro-2H-benzo[b] quinolizin-1(6H)-one,
8-trifluoromethyl-3,4,11,11a-tetrahydro-2H-benzo[b] quinolizin-1(6H)-one,
9-trifluoromethyl-3,4,11,11a-tetrahydro-2H-benzo[b] quinolizin-1(6H)-one, and
3,4,11,11a-tetrahydro-2H-benzo[b]quinolizin-1(6H)-one.

In the preferred practice of the present invention the compounds of the formula

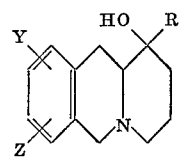

in which R is hydrogen are preferably prepared by dissolving the desired ketone starting material in a lower alkanol, such as methanol, to which sodium borohydride is slowly added. If necessary, the resulting mixture is heated to keep the ketone in solution. The reaction is allowed to proceed at room temperature or at a slightly elevated temperature. Upon cooling the desired 1-hydroxybenzo[b]quinolizine precipitates. The compounds in which R is hydrogen are available as both the cis and trans isomers which may be separated chromatographically.

The described process may be illustrated as follows:

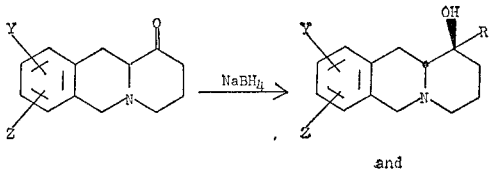

and

in which Y and Z are as defined and R is hydrogen.

Representative of the compounds which may be prepared by this process are

Cis-8,9-dimethoxy-1-hydroxy-1,3,4,6,11,11a-hexahydro-2H-benzo[b]quinolizine,
Trans-8,9-dimethoxy-1-hydroxy-1,3,4,6,11,11a-hexahydro-2H-benzo[b]quinolizine,
8-chloro-1-hydroxy-1,3,4,6,11,11a-hexahydro-2H-benzo[b]quinolizine,
9-chloro-1-hydroxy-1,3,4,6,11,11a-hexahydro-2H-benzo[b]quinolizine,
8-trifluoromethyl-1-hydroxy-1,3,4,6,11,11a-hexahydro-2H-benzo[b]quinolizine,
9-trifluoromethyl-1-hydroxy-1,3,4,6,11,11a-hexahydro-2H-benzo[b]quinolizine,
10-fluoro-1-hydroxy-1,3,4,6,11,11a-hexahydro-2H-benzo[b]quinolizine,
8-methylsulfamoyl-1-hydroxy-1,3,4,6,11,11a-hexahydro-2H-benzo[b]quinolizine, and
1,7-dihydroxy-1,3,4,6,11,11a-hexahydro-2H-benzo[b]quinolizine.

The reaction between the ketone starting material and the Grignard reagent is conveniently effected by bringing the reactants together under conditions generally employed in reacting a Grignard reagent with a ketone to form a tertiary alcohol. The reactants are advisably combined in an anhydrous solvent such as ethyl ether, tetrahydrofuran or ethyl ether with benzene. The reaction mixture, if desired, can be heated at temperatures up to the reflux temperatures to promote the reaction. When the reaction is terminated water is added to hydrolyze the Grignard adduct to the desired tertiary alcohol. The resulting product can then be isolated from the mixture by conventional means such as evaporation of the solvent.

The described process may be illustrated as follows:

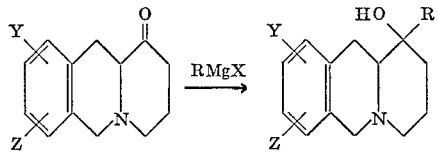

in which Y, Z and R are as previously described and X is a reactive halogen.

Among the Grignard reagents which may be employed are the following:

methylmagnesium bromide,
phenylmagnesium bromide,
phenylmagnesium iodide,
ethylmagnesium chloride,
m-chlorobenzylmagnesium bromide, and
benzylmagnesium bromide.

The Grignard reagents may be prepared by conventional methods such as those described in U.S. Patent 2,996,503 and German Patent 1,109,166.

Representative of the compounds which may be prepared by the practice of the present invention are 1-hydroxy-1-phenyl-1,3,4,6,11,11a-hexahydro-2H-benzo[b]quinolizine,
8-chloro-1-hydroxy-1-phenyl-1,3,4,6,11,11a-hexahydro-2H-benzo[b]quinolizine,
8-trifluoromethyl-1-hydroxy-1-phenyl-1,3,4,6,11,11a-hexahydro-2H-benzo[b]quinolizine,
8-methylsulfamoyl-1-hydroxy-1-phenyl-1,3,4,6,11,11a-hexahydro-2H-benzo[b]quinolizine,
9-chloro-1-hydroxy-1-phenyl-1,3,4,6,11,11a-hexahydro-2H-benzo[b]quinolizine,
8,9-dimethoxy-1-hydroxy-1-phenyl-1,3,4,6,11,11a-hexahydro-2H-benzo[b]quinolizine,
8,9-dimethoxy-1-hydroxy-1-(3-chlorobenzyl)-1,3,4,6,11,11a-hexahydro-2H-benzo[b]quinolizine,
1-hydroxy-1-(3-chlorobenzyl)-1,3,4,6,11,11a-hexahydro-2H-benzo[b]quinolizine, and
1-hydroxy-1-(3'-trifluoromethylphenyl)-1,3,4,6,11,11a-hexahydro-2H-benzo[b]quinolizine.

The compounds of the present invention demonstrated in behavioral screening tests in mice a central nervous system stimulant activity. The behavior of mice receiving 30 to 100 mg./kg. intraperitoneally of the following compounds was characterized by general symptoms of central nervous system stimulation such as increased awareness and irritability:

cis-8,9-dimethoxy-1-hydroxy-1,3,4,6,11,11a-hexahydro-2H-benzo[b]quinolizine,
trans-8,9-dimethoxy-1-hydroxy-1,3,4,6,11,11a-hexahydro-2H-benzo[b]quinolizine,
1-hydroxy-1-phenyl-1,3,4,6,11,11a-hexahydro-2H-benzo[b]quinolizine,
8,9-dimethoxy-1-hydroxy-1-phenyl-1,3,4,6,11,11a-hexahydro-2H-benzo[b]quinolizine,
8,9-dimethoxy-1-hydroxy-1-(3-chlorobenzyl)-1,3,4,6,11,11a-hexahydro-2H-benzo[b]quinolizine, and
1-hydroxy-1-(3-chlorobenzyl)-1,3,4,6,11,11a-hexahydro-2H-benzo[b]quinolizine.

As a result of the behavioral tests the above compounds were all found to have $LD_{50}$'s in excess of 175 mg./kg. The behavioral tests were conducted in accordance with the procedure set forth by Irwin in "Animal and Clinical Pharmacologic Techniques in Drug Evaluation," J. H. Nodine and P. E. Siegler, ed., Year Book Publishers, Inc. (1964) pp. 36–54.

The compounds cis-8,9-dimethoxy - 1 - hydroxy-1,3,4,6,11,11a-hexahydro-2H-benzo[b]quinolizine and trans-8,9-dimethoxy - 1 - hydroxy - 1,3,4,6,11,11a - hexahydro-2H-benzo[b]quinolizine were also found to be effective in controlling the aggressive antisocial behavior of mice which had been isolated for periods of two weeks. The effective dose was approximately 10 mg./kg. intraperitoneally for each of the compounds.

When intended for pharmaceutical use the compounds and the acid addition salts of the compounds which are capable of forming such salts are preferably combined with one or more suitable diluents and formed into unit dosage forms for oral or parenteral administration such as tablets, capsules or solutions.

The acid addition salts of the compounds of this invention may be produced by contacting the free base with a suitable organic or inorganic acid such as hydrochloric, sulfuric, phosphoric, maleic, fumaric and citric acid in a suitable mutual solvent.

The compounds of this invention form thiocyanic acid additions which when condensed with formaldehyde form resinous materials useful as pickling agents according to U.S. Pats. 2,425,320 and 2,606,155. The compounds also form fluosilicic acid addition salts which are useful as wood preservatives and mothproofing agents according to U.S. Pats. 1,915,334 and 2,075,359.

The following examples are presented to illustrate this invention:

Example 1.—Cis-8,9-dimethoxy-1-hydroxy-1,3,4,6,11,11a-hexahydro-2H-benzo[b]quinolizine In 100 ml. warm methanol is dissolved 5.0 g. (0.019 mole) of 8,9-dimethoxy-3,4,11,11a-tetrahydro-2H-benzo[b]quinolizin-1(6H)-one and 0.755 g. (0.02 mole) sodium borohydride is slowly added. Heat (steambath) is required to keep the ketone in solution initially. After all reagents are dissolved the mixture is allowed to stir and cool to room temperature at which point a white solid precipitates. The mixture is stirred for an additional 30 minutes and cooled in the refrigerator. The solid is collected and recrystallized from methanol to give cis-8,9-dimethoxy - 1 - hydroxy-1,3,4,6,11,11a-hexahydro-2H-benzo[b]quinolizine, M.P. 192–194°.

Analysis.—Calcd. for $C_{15}H_{21}NO_3$ (percent): C, 68.41; H, 8.04; N, 5.32. Found (percent): C, 68.65; H, 7.85; N, 5.40.

Example 2.—Trans-8,9-dimethoxy-1-hydroxy-1,3,4,6,
11,11a-hexahydro-2H-benzo[b]quinolizine The mother liquor from the above experiment is concentrated to give a yellow solid which is chromatographed over silica gel ($CHCl_3:Et_2O:MeOH$; 5:4:1). The carbinol trans-8,9-dimethoxy - 1 - hydroxy-1,3,4,6,11,11a-hexahydro-2H-benzo[b]quinolizine is collected as a white solid, M.P. 166–168°.

Analysis.—Calcd. for $C_{15}H_{21}NO_3$ (percent): C, 68.41; H, 8.04; N, 5.32. Found (percent): C, 68.22; H, 8.07; N, 5.42.

Example 3.—1-hydroxy-1-phenyl-1,3,4,6,11,11-a-hexahydro-2H-benzo[b]quinolizine

To 0.04 mole phenylmagnesium bromide in 20 ml. diethyl ether is added 3.5 g. (0.017 mole) 3,4,11,11a-tetrahydro-2H-benzo[b]quinolizin-1(6H)-one suspended in 20 ml. THF. The mixture is stirred at room temperature for 2 hours, cooled and quenched with saturated ammonium chloride solution. The aqueous layer is separated from the ether, extracted with ether and the organic extracts combined, washed with brine, and dried. Removal of solvent affords a semi-solid product which is recrystallized from isopropanol to give 1-hydroxy-1-phenyl-1,3,4,6,11,11a-hexahydro-2H-benzo[b]quinolizine as white plates, M.P. 165–168°.

Analysis.—Calcd. for $C_{19}H_{21}NO$ (percent): C, 81.68; H, 7.58; N, 5.02. Found (percent): C, 81.81; H, 7.61; N, 4.97.

Example 4.—8,9 - dimethoxy-1-hydroxy-1-phenyl-1,3,4,6,
11,11a-hexahydro-2H-benzo[b]quinolizine To 25 ml. of dry ether is added magnesium (0.365 g., 0.015 mole) and a few drops of bromobenzene. After the reaction starts the remainder of bromobenzene (2.36 g., 0.015 mole) is added to maintain reflux. 8,9-dimethoxy-3,4,11,11a - tetrahydro - 2H - benzo[b]quinolizin-1(6H)-one (1.4 g., 0.00536 mole) is added as a suspension in THF and stirred for one hour at room temperature. The reaction is quenched with 200 ml. saturated ammonium chloride solution and the organic phase separated from the aqueous, washed with water, extracted with 5% hydrochloric acid solution, neutralized with sodium bicarbonate and extracted into ethyl acetate, washed with water and dried. Removal of solvent affords a yellow oil which is chromatographed over silica gel ($EtOAc:Et_2O:MeOH$; 5:4:1) to give 8,9-dimethoxy-1-hydroxy-1-phenyl-1,3,4,6,11,11a-hexahydro-2H-benzo[b]quinolizine as a white solid, M.P. 134–135°.

Analysis.—Calcd. for $C_{21}H_{25}NO_3$ (percent): C, 74.30; H, 7.42; N, 4.13. Found (percent): C, 74.34; H, 7.55; N, 4.05.

Example 5.—8,9-dimethoxy - 1 - hydroxy-1-(3-chlorobenzyl)-1,3,4,6,11,11a-hexahydro-2H-benzo[b]quinolizine To 25 ml. dry ether are added 0.55 g. (0.022 mole) magnesium, a few drops of m-chlorobenzyl bromide and a crystal of iodine. After the reaction starts, the remainder of the benzyl halide is added at a rate to maintain reflux (total added is 4.66 g., 0.0227 mole). 8,9-dimethoxy-3,4,11,11a-tetrahydro-2H-benzo[b]quinolizin-1(6H)-one (2.0 g., 0.0076 mole) is added as a suspension in 25 ml. THF. The homogeneous solution is stirred at room temperature for an additional hour after which 200 ml. saturated ammonium chloride is added. The organic layer is separated from the aqueous, washed with water and extracted with 5% hydrochloric acid, made basic with sodium bicarbonate, and extracted into ethyl acetate, washed with water and dried. Removal of solvent affords an oil which is chromatographed over silica gel ($EtOAc:Et_2O:MeOH$; 4:4:1) to give 8,9-dimethoxy-1-hydroxy-1-(3-chlorobenzyl)-1,3,4,6,11,11a-hexahydro-2H-benzo[b]quinolizine as a white solid, M.P. 151–153°.

Analysis.—Calcd. for $C_{22}H_{26}NO_3Cl$ (percent): C, 68.11; H, 6.75; N, 3.61. Found (percent): C, 67.98; H, 6.77; N, 3.66.

Example 6.—1-hydroxy - 1 - (3-chlorobenzyl)-1,3,4,6,11,
11a-hexahydro-2H-benzo[b]quinolizine To 20 ml. dry ether is added 0.96 g. (0.04 mole) magnesium and 8.20 g. (0.04 mole) 3-chlorobenzyl bromide is added dropwise. After the Grignard is prepared 4.47 g. (0.022 mole) of 3,4,11,11a-tetrahydro-2H-benzo[b]quinolizin-1(6H)-one is added as a suspension in THF and stirred for 3 hours at room temperature. The system is cooled and saturated ammonium chloride solution added, the organic layer is separated from the aqueous, washed and dried. Removal of solvent affords a crystalline mass from which a solid material is collected and recrystallized from ethanol:chloroform. The mother liquors are combined and chromatographed over silica gel ($CHCl_3:Et_2O$; 3:7) to give more 1-hydroxy-1-(3-chlorobenzyl)-1,3,4,6,11,11a-hexahydro-2H-benzo[b]quinolizine as a solid, M.P. 178–180°.

Analysis.—Calcd. for $C_{21}H_{22}NOCl$ (percent): C, 73.26; H, 6.76; N, 4.23. Found (percent): C, 73.67; H, 7.19; N, 4.27.

Example 7.—1-hydroxy-1-(3'-trifluoromethylphenyl)-1,3,
4,6,11,11a-hexahydro-2H-benzo[b]quinolizine In 10 ml. dry ether 1.22 g. (0.05 mole) magnesium is allowed to react with 11.25 g. (0.05 mole) m-bromobenzotrifluoride. The volume of ether is gradually raised to a final volume of 100 ml. The 3,4,11,11a-tetrahydro-2H-benzo[b]quinolizin-1(6H)-one (3.49 g., 0.0174 mole) is slowly added as a dry powder to the prepared Grignard reagent and the mixture allowed to reflux two hours, cooled and quenched with 200 ml. concentrated ammonium chloride. The organic layer is separated from the aqueous, washed with water and dried. Evaporation of the solvent gives an oil which is chromatographed over silica gel ($CHf:EtOH$; 9.8:0.2) to give the semi-pure carbinol. The material is recrystallized from methanol to give 1-hydroxy - 1 - (3' - trifluoromethylphenyl) - 1,3,4,6,11,11a-hexahydro-2H-benzo[b]quinolizine as a white solid, M.P. 142–143° C.

Analysis.—Calcd. for $C_{20}H_{20}NOF_3$ (percent): C, 69.14; H, 5.80; N, 4.04. Found (percent): C, 69.32; H, 5.85; N, 3.84.

We claim:
1. A compound of the formula

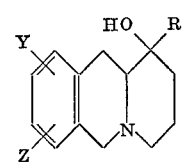

wherein Y and Z are lower alkoxy of 1 to 4 carbon atoms, and R is selected from hydrogen, phenyl, and chlorobenzyl.

2. The compound of claim 1 in which Y and Z are methoxy and R is hydrogen.

3. The compound of claim 1 in which Y and Z are methoxy and R is phenyl.

4. The compound of claim 1 in which Y and Z are methoxy and R is chlorobenzyl.

References Cited

UNITED STATES PATENTS 3,408,352  10/1969  Hardtmann _____ 260—289
3,484,443  12/1969  Watthey _____ 260—289

OTHER REFERENCES

Miller et al.: Chem. Abstr., vol. 71, col. 37263e (1969).
Kupchan et al.: Chem. Abstr., vol. 65, col. 3833 (1966) (abstracting J. Org. Chem., vol. 31, pp. 1716–20).
Kupchan et al.: Jour. Org. Chem., vol. 31, p. 1713 (1966).
Archer et al.: Jour. Org. Chem., vol. 16, pp. 430–1 (1951).

DONALD G. DAUS, Primary Examiner

U.S. Cl. X.R.

260—283 SA, 999